L. A. HOERR.
PIPE HANGER.
APPLICATION FILED APR. 19, 1913.
1,111,069. Patented Sept. 22, 1914.
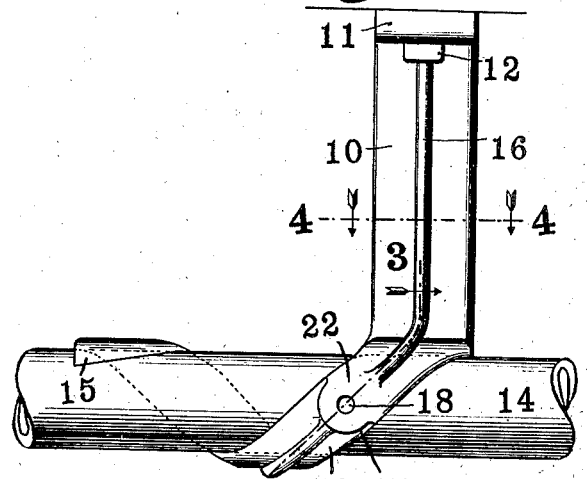
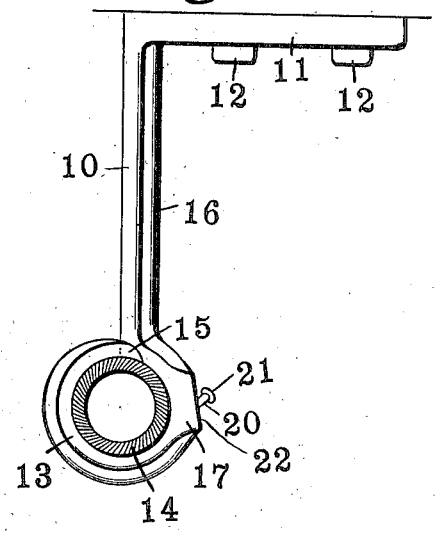
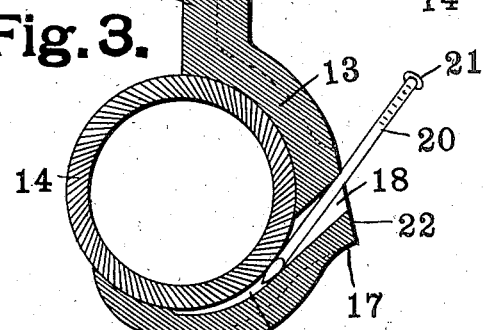
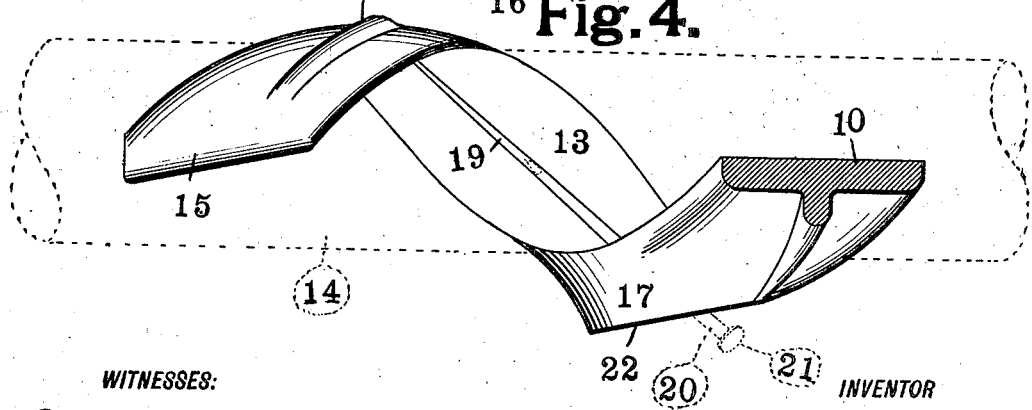
WITNESSES:
W. H. Alexander.
INVENTOR
Louis A. Hoerr.
BY
E. E. Huffman
ATTORNEY.

UNITED STATES PATENT OFFICE.

LOUIS A. HOERR, OF ST. LOUIS, MISSOURI.

PIPE-HANGER.

1,111,069.  Specification of Letters Patent.  Patented Sept. 22, 1914.

Application filed April 19, 1913. Serial No. 762,306.

*To all whom it may concern:*

Be it known that I, LOUIS A. HOERR, a citizen of the United States of America, residing at the city of St. Louis, State of Missouri, have invented a certain new and useful Pipe-Hanger, of which the following is such a full, clear, and exact description as will enable any one skilled in the art to which it appertains to make and use the same, reference being had to the accompanying drawings, forming part of this specification.

My invention relates to pipe hangers and particularly to a pipe hanger having a spiral gripping member extending around the pipe.

The object of my invention is to provide a pipe hanger of the type referred to with wedging means for securing an additional gripping effect between the pipe and holder.

In the accompanying drawings, which illustrate one form of pipe hanger made in accordance with my invention, Figure 1 is a side elevation; Fig. 2 is an end view; Fig. 3 is an enlarged section taken on the line 3—3 of Fig. 1, and Fig. 4 is an enlarged section taken on the line 4—4 of Fig. 1.

Like marks of reference refer to similar parts in the several views of the drawings.

10 represents the stem of the supporting member of the holder. Extending at right angles from the stem 10 is a strap 11 adapted to be secured to any suitable object by means of bolts or lag screws 12. Formed integral with the lower end of the stem 10 is a spiral gripping member 13 which is adapted to fit around the pipe 14 to be supported. It is essential that this spiral gripping member 13 extend more than half way around the periphery of the pipe 14 and I prefer to extend it somewhat more than one complete revolution around the pipe 14 so that the end 15 may be sprung into clamping contact with the pipe 14 in the manner set forth in my prior Patent No. 1,057,057.

I prefer to provide both the stem 10 and the gripping member 13 with a strengthening rib 16. In order to provide wedging means for increasing the clamping effect between the hanger and pipe, I provide the spiral gripping member 13, at one side, with a thickened portion 17. In this portion 17 is formed an opening 18 which is substantially tangent to the surface of the pipe 14. This opening 18 communicates with a tapered groove 19 formed in the interior surface of the gripping member 13. 20 is a wedging member which is provided with a head 21 and is adapted to be driven through the opening 18 into the groove 19 where it exerts a wedging effect between the pipe and the hanger. Owing to the tapered form of the groove 19, it is not necessary to have the wedging member 20 itself wedge-shaped except at the point and I prefer to use an ordinary wire nail of the proper size for the wedging member 20.

It will be noted that the surface 22 of the hanger adjacent to the opening 18 is at an angle to the head 21 of the wedging member so that if the wedging member 20 is driven completely into the opening 18, one edge of the head will project so that it may be engaged by a claw hammer or other suitable tool and removed.

The operation of my device will be evident. By the use of the wedging member 20, the clamping effect between the hanger and pipe may be increased to any desired extent.

Having fully described my invention, what I claim as new and desire to secure by Letters-Patent of the United States is:

1. In a pipe hanger, the combination with a member embracing the pipe, said hanger having an opening extending laterally through it, and a wedging member adapted to be driven through said opening between said pipe and hanger to lock said parts together.

2. In a pipe hanger, the combination with a member embracing the pipe, said member having an opening extending laterally through it and communicating with a tapered groove, and a wedging member adapted to be driven through said opening and into said groove.

3. In a pipe hanger, the combination with a member extending spirally around the pipe, said hanger having an opening extending laterally through it, of a wedging member adapted to be driven through said opening between said pipe and hanger to lock said parts together.

4. In a pipe hanger, the combination with a member extending spirally around the pipe, said hanger having an opening extending laterally through it and communicating with a tapering groove, and a wedging member adapted to be driven through said opening and into said groove.

5. In a pipe hanger, the combination with a member adapted to embrace a pipe, said member having an opening extending laterally through it, of a headed wedging member adapted to be driven through said opening, the surface of said hanger adjacent to said opening being at an angle to the head of said wedging member.

6. In a pipe hanger, the combination with a member extending spirally around a pipe, said member having an opening extending laterally through it and communicating with a tapering groove, of a headed wedging member adapted to be driven through said opening and into said groove, the surface of said hanger adjacent to said opening being at an angle to the head of said wedging member.

In testimony whereof, I have hereunto set my hand in the presence of the two subscribing witnesses.

LOUIS A. HOERR.

Witnesses:
W. A. ALEXANDER,
G. M. SHORE.